United States Patent
Haerter et al.

(10) Patent No.: US 12,281,698 B2
(45) Date of Patent: Apr. 22, 2025

(54) DRIVE AXLE FOR A MOTOR VEHICLE, IN PARTICULAR FOR A PASSENGER CAR, AND MOTOR VEHICLE

(71) Applicant: MERCEDES-BENZ GROUP AG, Stuttgart (DE)

(72) Inventors: Tobias Haerter, Stuttgart (DE); Tobias Schilder, Ludwigsburg (DE); Jonathan Zeibig, Aalen (DE); Peter Hahn, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/717,476

(22) PCT Filed: Nov. 18, 2022

(86) PCT No.: PCT/EP2022/082485
§ 371 (c)(1),
(2) Date: Jun. 7, 2024

(87) PCT Pub. No.: WO2023/104479
PCT Pub. Date: Jun. 15, 2023

(65) Prior Publication Data
US 2024/0401682 A1  Dec. 5, 2024

(30) Foreign Application Priority Data
Dec. 9, 2021  (DE) .................. 10 2021 006 074.1

(51) Int. Cl.
*B60K 1/02* (2006.01)
*B60K 17/02* (2006.01)
(Continued)

(52) U.S. Cl.
CPC ............... *F16H 48/36* (2013.01); *B60K 1/02* (2013.01); *B60K 17/02* (2013.01); *B60K 17/046* (2013.01);
(Continued)

(58) Field of Classification Search
CPC ........ B60K 1/02; B60K 17/02; B60K 17/046; B60K 17/165; B60K 23/04;
(Continued)

(56) References Cited

U.S. PATENT DOCUMENTS 9,221,334 B2  12/2015 Knoblauch
11,192,434 B2  12/2021 Hummel
(Continued)

FOREIGN PATENT DOCUMENTS

DE  102010005789 A1 *  7/2011 ............... B60K 1/02
DE  102011056047 A1   6/2013
(Continued)

OTHER PUBLICATIONS

International Search Report and Written Opinion mailed Mar. 2, 2023 in related/corresponding International Application No. PCT/EP2022/082485.

*Primary Examiner* — Tinh Dang
(74) *Attorney, Agent, or Firm* — PATENT PORTFOLIO BUILDERS PLLC (57) ABSTRACT

A drive axle for a motor vehicle includes two vehicle wheels, a first shaft by which a first of the vehicle wheels can be driven and a second shaft by which the second vehicle wheel can be driven. The drive axle also includes a first electric motor having a first stator and a first rotor, a differential gear by which the shafts can be driven and, via the shafts, the vehicle wheels can be driven by the first rotor of the first electric motor, and a second electric motor having a second stator and a second rotor. Only one of the shafts is (Continued)

assigned a clutch, by means of which the one shaft can be connected to the second rotor in a torque-transmitting manner, bypassing the other shaft and the differential gear.

16 Claims, 2 Drawing Sheets

(51) Int. Cl.
    *B60K 17/04*     (2006.01)
    *B60K 17/16*     (2006.01)
    *B60K 23/04*     (2006.01)
    *F16H 37/08*     (2006.01)
    *F16H 48/36*     (2012.01)

(52) U.S. Cl.
    CPC ............ *B60K 17/165* (2013.01); *B60K 23/04* (2013.01); *F16H 37/082* (2013.01); *B60K 2023/043* (2013.01); *F16H 2048/364* (2013.01)

(58) Field of Classification Search
    CPC ............... B60K 2023/043; F16H 48/36; F16H 2048/364; F16H 37/082
    See application file for complete search history.

(56) References Cited

U.S. PATENT DOCUMENTS

| | | | |
|---|---|---|---|
| 2014/0332301 A1* | 11/2014 | Knoblauch | ............ B60K 17/35 180/65.6 |
| 2014/0335995 A1* | 11/2014 | Swales | ................ F16H 57/0483 477/3 |
| 2019/0072168 A1 | 3/2019 | Yamamura | |
| 2023/0001777 A1* | 1/2023 | Wang | ....................... B60K 1/00 |

FOREIGN PATENT DOCUMENTS

| | | | | |
|---|---|---|---|---|
| DE | 102011056929 A1 | 6/2013 | | |
| DE | 102016218717 B3 | 2/2018 | | |
| DE | 102018203366 A1 | 9/2019 | | |
| DE | 102019202994 A1 | 9/2020 | | |
| DE | 102019115918 A1 | 12/2020 | | |
| DE | 102020006869 A1 * | 5/2022 | ............... | B60K 1/02 |
| WO | 2013083215 A1 | 6/2013 | | |

\* cited by examiner

Fig.1

| | A | B | K1 | 22 | 32 |
|----|---|---|------|----|-----|
| B1 |   | X |      | X  |     |
| B2 | X |   | (X)  | X  | X   |
| B3 |   | X | X    | X  | (X) |

Fig.2

DRIVE AXLE FOR A MOTOR VEHICLE, IN PARTICULAR FOR A PASSENGER CAR, AND MOTOR VEHICLE

BACKGROUND AND SUMMARY OF THE INVENTION

Exemplary embodiments of the invention relate to a drive axle for a motor vehicle, in particular for a passenger car, as well as to a motor vehicle, in particular a passenger car having such a drive axle.

DE 10 2011 056 047 A1 discloses a drive train of a purely electric four-wheel-drive automobile. An electric vehicle axle device is known from DE 10 2018 203 366 A1. Furthermore, a drive train of a purely electrically driven automobile is taken as known from WO 2013/083215 A1.

Exemplary embodiments of the present invention are directed to a drive axle for a motor vehicle and a motor vehicle having such a drive axle, so that a particularly efficient drive and particularly advantageous driving dynamics of the motor vehicle can be achieved.

A first aspect of the invention relates to a drive axle for a motor vehicle, in particular for a passenger car. This means that the motor vehicle, preferably formed as a passenger car, has the drive axle in its completely produced state. In particular, the motor vehicle has, for example, at least or exactly two vehicle axles, also simply referred to as axles, arranged in the vehicle longitudinal direction, in succession and thus consecutively, in its completely produced state, wherein, in particular at least one of the vehicle axles is the drive axle. The respective vehicle axle has at least or exactly two respective vehicle wheels, which are also simply referred to as wheels and are arranged, for example, on opposite sides of the motor vehicle in the transverse direction of the motor vehicle. The vehicle wheels are ground contact elements, by which the motor vehicle is or can be supported downwards on ground, in the vertical direction of the vehicle. If the motor vehicle drives along the ground whilst the motor vehicles are supported downwards on the ground by the vehicle wheels, in the vertical direction of the vehicle, the vehicle wheels roll, in particular directly on the ground. When the vehicle wheels are referred to in the following, this means the vehicle wheels of the drive axle, unless otherwise specified. As will be explained in more detail below, the vehicle wheels and therefore the motor vehicle can be driven, so that the vehicle wheels are drivable or driven wheels.

The drive axle has a first shaft, in particular a first side shaft, by which a first of the vehicle wheels of the drive axle can be driven. Furthermore, the drive axle has a second shaft, in particular a second side shaft, by which the second vehicle wheel of the drive axle can be driven. The drive axle has a first electric motor, which has a first stator and a first rotor. For example, the first rotor can be driven by means of the first stator and thus can be rotated around a first motor axis of rotation, relative to the first stator. The first electric motor can provide first drive torques via the first rotor to drive the vehicle wheels of the drive axle. Furthermore, the drive axle has a differential gear, by which the shafts can be driven, in particular simultaneously by means of the first rotor and thus by means of the first electric motor. Thus, the vehicle wheels can be driven by the shafts, in particular simultaneously, by means of the first rotor and thus by means of the first electric motor. In other words, the first shaft can be driven by the differential gear by the first rotor, and the first vehicle wheel can be driven by the first shaft, and the second shaft can be driven by the differential gear by the first rotor, and the second vehicle wheel can be driven by the second shaft. The respective first drive torque provided by the first rotor or a resulting further torque can be transmitted to the respective shaft via the differential gear, whereby the respective shaft can be driven and thus rotated about a respective shaft axis of rotation, in particular relative to a housing of the drive axle. The respective shaft can provide a respective output torque, which, for example, is the respective, further torque, or the respective first drive torque, or results from the respective first drive torque. In particular, the shafts which are also referred to as output shafts, are arranged coaxially to each other, so that preferably the shaft axes of rotation coincide.

Preferably, the vehicle wheels and thus the motor vehicle can be driven, in particular purely electrically, so that the motor vehicle can preferably be an electric vehicle, in particular a battery electric vehicle (BEV), or also a hybrid vehicle.

Furthermore, the drive axle has a second electric motor, which is provided in addition to the first electric motor and which has a second stator and a second rotor. In particular, the second rotor can be driven by means of the second stator and thus can be rotated around a second motor axis of rotation, relative to the second stator and thus relative to the housing. In particular, the first rotor can be rotated around the first motor axis of rotation, relative to the housing, for example. In particular, it is conceivable that at least one of the electric motors, in particular both electric motors, and/or at least one of the shafts, in particular both shafts, and/or the differential gear are each arranged at least partially in the housing.

The differential, also known simply as an axle differential or axle drive, allows, for example, as is already well known from the general prior art, different speeds of the shafts and thus different speeds of the vehicle wheels, in particular when the motor vehicle is cornering, so that, for example, the vehicle wheel on the outside of the bend can rotate at a higher speed than the vehicle wheel on the inside of the bend, in particular while the vehicle wheels are coupled to the first rotor via the shafts and the differential gear in a torque-transmitting manner and can therefore be driven or are driven by the first rotor. For example, the differential gear can be designed as a bevel gear differential.

In order to drive the motor vehicle particularly efficiently and to be able to realize a particularly advantageous driving dynamic, only one of the shafts is assigned a clutch, by means of which a shaft can be connected to the second rotor in a torque-transmitting manner, in particular for conjoint rotation, bypassing the other shaft and the differential gear. This means that, in relation to the two shafts, only one shaft can be connected to the second rotor in a torque-transmitting manner, bypassing the other shaft and bypassing the differential gear, wherein the aforementioned clutch is designed or provided for this purpose. In other words, for example, in relation to the first shaft and the second shaft, only the first shaft or only the second shaft can be connected to the second rotor in a torque-transmitting manner, in particular for conjoint rotation, bypassing the second shaft or the first shaft and bypassing the differential gear, with the clutch being provided or designed for this purpose. One shaft can therefore be the first shaft or the second shaft, so that the other shaft is the second shaft or the first shaft.

The feature that one shaft can be connected to the second rotor in a torque-transmitting manner by means of the clutch, bypassing the other shaft and bypassing the differential gear, is to be understood as follows: The second electric motor can provide respective second drive torques via its second rotor.

The respective second drive torque, which is provided or can be provided by the second rotor, can be transmitted from the second rotor to the one shaft along a torque flow via the clutch, so that the clutch is arranged in the torque flow. The other shaft and the differential are not arranged in the torque flow, i.e., outside the torque flow, or at least not in the torque flow between the first rotor and the one shaft, so that the respective second drive torque bypasses both the other shaft and the differential gear on its path along the torque flow from the second rotor via the clutch to or onto the one shaft, i.e., does not flow via the other shaft and also not via the differential gear along the torque flow from the second rotor onto the one shaft. In other words, neither the other shaft nor the differential gear is used to transmit the respective second drive torque from the second rotor to the one shaft via the clutch. The clutch however, is arranged in the torque flow and thus downstream of the second rotor and upstream of the one shaft, so that the respective second drive torque flows via the clutch on its path from the second rotor onto or to the one shaft, however not via the differential gear or via the other shaft. The clutch can be switched between at least one closed state and at least one open state, for example, i.e., closed or opened. In the open state of the clutch, i.e., when the clutch is open, the torque flow is interrupted for example, in particular by means of the clutch. In the closed state, i.e., when the clutch is closed, the torque flow for example is closed, in particular by means of the clutch. Thus, for example, in the open state of the clutch, no torque can be transmitted from the second rotor via the clutch to the one shaft, bypassing the differential gear and bypassing the other shaft, or in the closed state, at most a first torque, in particular greater than zero, can be transmitted from the second rotor via the clutch to or onto the one shaft, bypassing the other shaft and bypassing the differential gear. In the closed state of the clutch, a respective second torque, which is, in particular, greater than the first torque, can be transmitted from the second rotor via the clutch to or onto one shaft, bypassing the other shaft and bypassing the differential gear, wherein, for example, the respective second torque can be the respective second drive torque.

The drive axle is therefore free of a clutch device by which the respective second drive torque could be transmitted from the second rotor to the other shaft, bypassing one shaft and bypassing the differential gear. If necessary, a further clutch could be provided, by which the respective second drive torque or a respective torque resulting from the respective drive torque could be transmitted from the second rotor to the other shaft, but then the respective second drive torque or the respective torque resulting from it does not bypass one shaft and the differential gear, but is transmitted from the second rotor to the other shaft via the differential gear and/or via one shaft, for example. In other words, in relation to the shafts, the second electric motor or the second rotor only acts on one shaft, but not on the other shaft, which means that the number of parts, the installation space required, the costs, and the weight of the drive axle can be kept particularly low. Furthermore, losses, e.g., friction losses in the drive axle can be kept in a particularly low range, whereby a particularly efficient and thus low-energy drive can be represented. The fact that the second rotor can operate via the clutch onto the one shaft, bypassing the other shaft and the differential gear, as the respective second drive torque can be transmitted via the clutch from the second rotor onto the one shaft, bypassing the other shaft and the differential gear, a yaw moment can be generated as needed for example, whereby particularly good cornering, in particular bend exit, and thus an advantageous driving dynamic of the motor vehicle can be achieved, for example.

Since one shaft can be connected to the second rotor by means of the clutch, bypassing the other shaft and bypassing the differential gear, in a torque-transmitting manner, in particular for conjoint rotation, the respective second drive torque, which is provided or can be provided by the second rotor, can be transmitted from the second rotor via the clutch to the one shaft, bypassing the other shaft and bypassing the differential gear, whereby the respective second drive torque can be fed into the one shaft, so to speak. This allows the yaw moment described above to be generated, in particular in relation to the entire motor vehicle, also referred to as an automobile or vehicle, and in particular about the vehicle's vertical direction.

However, the reverse is also possible: Since the clutch can be used to connect one shaft to the second rotor of the second electric motor, bypassing the other shaft and bypassing the differential gear, in a torque-transmitting manner, in particular for conjoint rotation, a respective torque, also referred to as shaft torque, can be transmitted from the one shaft via the clutch to the second rotor, bypassing the other shaft and bypassing the differential gear, so that the respective shaft torque can be conducted out or dissipated from the one shaft bypassing the other shaft and bypassing the differential gear and thereby transmitted to the second rotor. This can also be used to achieve a yaw moment, particularly around the vehicle's vertical direction.

For example, in order to transmit the respective second drive torque, in particular as a positive torque, from the second rotor via the clutch to one shaft, bypassing the other shaft and bypassing the differential gear, the second electric motor is operated, for example, in motor mode and thus as an electric motor. This generates, for example, a respective first yaw moment, in particular acting on the automobile, which acts, for example, in a first direction of rotation about the vehicle's vertical direction. For example, in order to transmit the respective shaft torque from one shaft via the clutch to the second rotor bypassing the other shaft and bypassing the differential gear, i.e., to dissipate the respective shaft torque from one shaft and transmit it to the second rotor bypassing the other shaft and bypassing the differential gear, the second electric motor is operated in generator mode and thus as a generator. This generates, for example, a second yaw moment acting in particular on the automobile (motor vehicle), which acts in a second direction of rotation opposite the first direction of rotation, for example around the vehicle's vertical direction (z-direction). It can be seen that the first yaw moment and the second yaw moment can be generated as needed so that, for example, both a particularly advantageous drive of the motor vehicle through a left-hand bend and a particularly advantageous drive of the motor vehicle through a right-hand bend can be achieved. In particular, by generating the respective yaw moment as required, the motor vehicle can be accelerated particularly advantageously out of a left-hand bend as well as out of a right-hand bend, and the motor vehicle can be driven particularly safely through a left-hand bend as well as through a right-hand bend. In particular, by operating the second electric motor accordingly, a respective value of the respective shaft torque and a respective value of the respective second drive torque can be set as required, whereby a torque distribution function also known as torque vectoring or torque vectoring function can be realized in a particularly advantageous manner. Furthermore, the clutch can be used as a differential lock, in particular in the closed state of the clutch. In advantageous embodiments of the invention, the second rotor is arranged coaxially to the shafts and can be connected for conjoint rotation and thus in a torque-transmitting manner to the one shaft by means of the clutch, bypassing the differential gear and the other shaft. This enables a particularly compact and weight-optimized design, so that a particularly efficient drive can be achieved.

In the context of the present disclosure, the feature that two components, such as the second rotor and the one shaft are connected to each other for conjoint rotation is to be understood as meaning that the components connected to each other for conjoint rotation are arranged coaxially to each other and, in particular when the components are driven, rotate together or simultaneously around a component axis of rotation common to the components, such as for example the shaft axis of rotation, with the same angular velocity, in particular relative to the housing. The feature that two components are connected to each other in a torque-transmitting manner means in particular that the components are coupled to each other in such a way that torques can be transmitted between the components, wherein if the components are connected to each other for conjoint rotation, the components are also connected to each other in a torque-transmitting manner.

The feature that two components are permanently connected to each other in a torque-transmitting manner means in particular that, for example, a switching element is not provided that can be switched between a coupled state connecting the components to each other in a torque-transmitting manner and a decoupled state in which no torques can be transmitted between the components, but the components are continuously or always and thus permanently connected to each other in a torque-transmitting manner, i.e., in such a way that a torque can be transmitted between the components. This means, for example, that one of the components can be driven by the other component and vice versa. In particular, the feature that the components are permanently connected to each other for conjoint rotation means that, for example, a switching element is not provided that can be switched between a coupled state in which the components are connected to each other for conjoint rotation and a decoupled state in which the components are decoupled from each other and rotatable relative to each other, in particular about the component axis of rotation, so that no torques can be transmitted between the components, but the components are continuously or always, i.e., permanently, connected or coupled to each other for conjoint rotation.

The feature that two components, such as the second rotor and the one shaft, can be connected to one another for conjoint rotation or in a torque-transmitting manner means, in particular, that the components are assigned a switching element which can be switched between at least one coupled state and at least one decoupled state. In the coupled state, the components are connected to each other by means of the switching element for conjoint rotation or in a torque-transmitting manner. In the decoupled state, the components are decoupled from each other, so that in the decoupled state the components can be rotated relative to each other, in particular about the component axis of rotation, or so that no torques can be transmitted between the components. The clutch is provided as the switching element so that, preferably in the closed state of the clutch, torques such as the respective second drive torque and the respective shaft torque can be transmitted via the clutch between the one shaft and the second rotor, bypassing the differential gear and bypassing the other shaft. In the open state of the clutch, for example, it is intended that no torques can be transmitted between one shaft and the second rotor via the clutch.

In order to be able to achieve particularly advantageous drivability and thus particularly advantageous driving dynamics, it is provided in a further embodiment of the invention that the clutch is designed as a friction clutch, in particular as a multi-plate clutch. In particular, this can be used to represent a load switching capability. Furthermore, this allows torques to be transmitted particularly advantageously via the clutch between one shaft and the second rotor, bypassing the other shaft and bypassing the differential gear, so that the aforementioned torque distribution function can be realized particularly well.

In order to keep the losses of the drive axle particularly low and thus be able to achieve a particularly efficient drive, it is provided in a further embodiment of the invention, that the drive axle has exactly one friction clutch, specifically the clutch, by means of which a shaft can be connected to the second rotor in a torque-transmitting manner, in particular for conjoint rotation, bypassing the other shaft and the differential gear.

In order to be able to achieve particularly compact design and thus a particularly efficient drive, it is provided in a further embodiment of the invention that the rotor is arranged coaxially to the shafts. Thus, the first motor axis of rotation coincides with the shaft axes of rotation.

Quite preferably, the second rotor is arranged coaxially to the shafts so that the second motor axis of rotation coincides with the shaft axes of rotation. Furthermore, it is preferable for the rotors to be arranged coaxially to each other so that the motor axes of rotation coincide.

A further embodiment of the invention is characterized in that the differential gear has a torque-transmitting input element, in particular one that is connected or can be connected to the first rotor for conjoint rotation, via which the respective drive torque provided or that can be provided by the first rotor can be introduced into the differential gear. In particular, for example, the input element is permanently connected to the first rotor in a torque-transmitting manner or for conjoint rotation. For example, in particular if the differential gear is a bevel gear differential, the input element is, for example, a differential cage or a gear wheel, in particular a ring gear.

It has proven to be particularly advantageous if the drive axle has a coupling device provided in addition to the clutch, by means of which coupling device the second rotor can be connected to the input element for conjoint rotation. As a result, both the respective first drive torque and the respective second drive torque can be transmitted to the input element, in particular simultaneously, and thus introduced into the differential gear via the input element, so that the shafts and, via the shafts, the vehicle wheels can be driven, in particular simultaneously, by means of both electric motors. This enables a particularly powerful drive, so that a particularly good driving dynamic can be achieved.

A further embodiment of the invention is characterized in that the coupling device is designed as a form-fitting coupling device, in particular as a dog clutch. This ensures particularly efficient operation.

Lastly, it has proven to be particularly advantageous if the respective vehicle wheel is assigned a respective planetary gearing by which the respective vehicle wheel can be driven by the respective shaft. For example, the respective planetary gearing is a so-called final transmission, also referred to as a final drive, which means that a particularly advantageous drivability can be achieved in a particularly space-saving, weight-saving and cost-effective manner.

A second aspect of the invention relates to a motor vehicle with, in particular at least or exactly, one drive axle according to the first aspect of the invention. Advantages and advantageous embodiments of the first aspect of the invention are to be regarded as advantages and advantageous embodiments of the second aspect of the invention and vice versa.

In particular, at least the following advantages can be realized by the invention:
- The costs of the drive axle can be kept particularly low by using just one friction element, such as the friction clutch mentioned above.
- In single-motor operation, in which the shafts and thus the vehicle wheels, in relation to the electric motors, are driven exclusively by one of the electric motors, for example by the first electric motor, particularly efficient operation can be realized.
- A particularly compact design can be realized.
- The diameter of the first electric motor can be designed at least almost freely and can, for example, utilize an installation space up to a ground clearance, as no shaft has to be guided past the outside of the first electric motor.
- In a locked mode, only two switching elements, in particular in the form of the clutch and the coupling device, need to be kept closed, so that actuator requirements can be kept particularly low.

The aforementioned locked mode means, in particular, that a differential lock of the differential gear is activated, the differential lock being realized in particular by the clutch and by the coupling device, in particular in that the clutch is in its closed state while the coupling device is closed, whereby the second rotor is connected for conjoint rotation to the input element via the coupling device.

Further advantages, features and details of the invention can be seen from the following description of a preferred exemplary embodiment and from the drawing. The features and combinations of features mentioned above in the description as well as the features and combinations of features mentioned below in the description of the figures and/or shown alone in the figures can be used not only in the combination indicated in each case, but also in other combinations or on their own, without departing from the scope of the invention.

BRIEF DESCRIPTION OF THE DRAWING FIGURES

Here the drawing shows in.

In the figures, identical or functionally identical elements are provided with the same reference signs.

DETAILED DESCRIPTION

Figure 1:
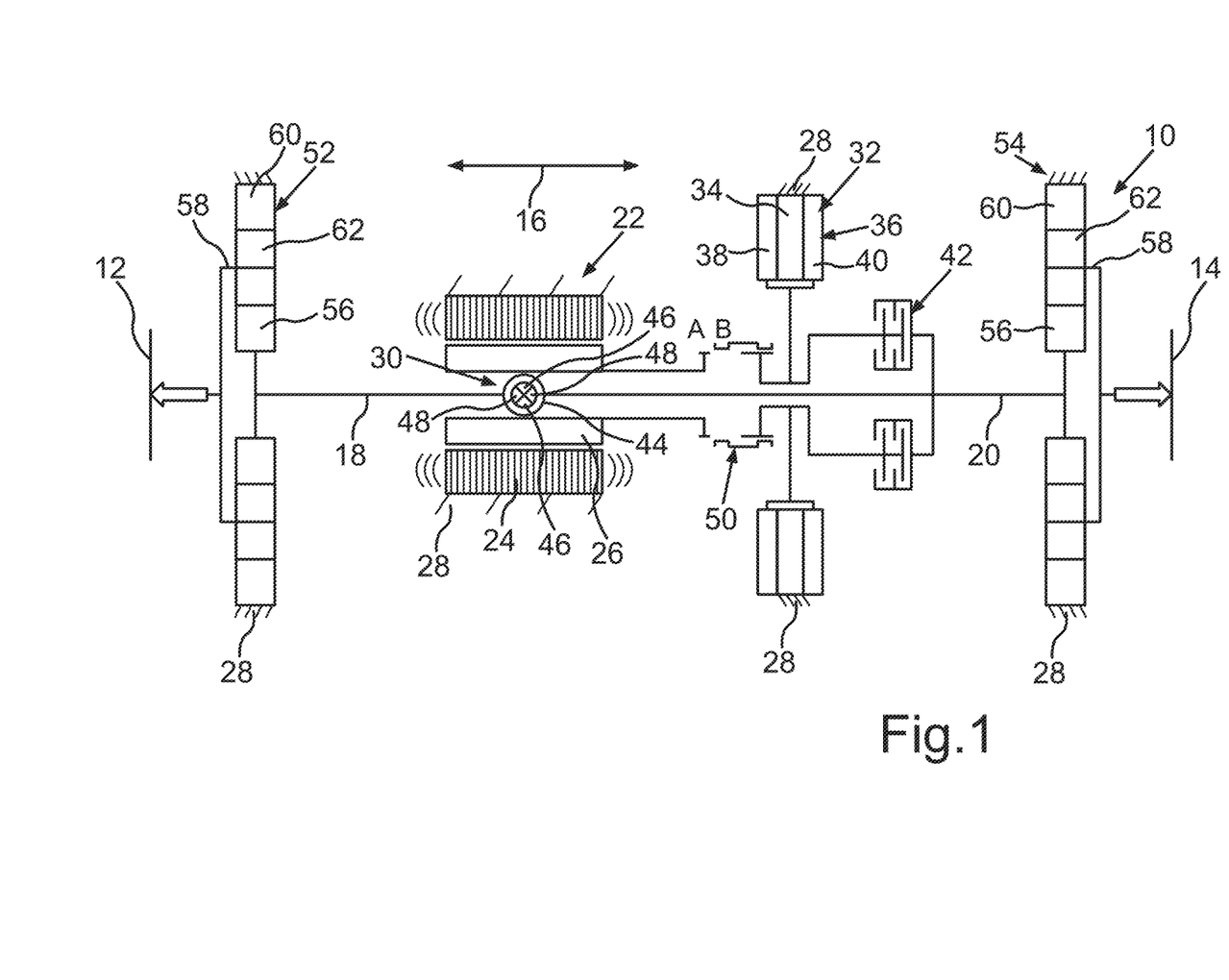
FIG. 1 a schematic representation of a drive axle for a motor vehicle.

FIG. 1 shows a drive axle 10 for a motor vehicle, in a schematic representation. The drive axle 10 is a vehicle axle which has, in particular exactly, two vehicle wheels 12 and 14, represented particularly schematically in FIG. 1. The vehicle wheels 12 and 14 are arranged on opposite sides of the motor vehicle in the transverse direction of the vehicle, the transverse direction of the vehicle being illustrated by a double arrow 16 in FIG. 1. The vehicle wheel 12 is also referred to as the first vehicle wheel, while the vehicle wheel 14 is also referred to as the second vehicle wheel. The drive axle 10 has a first shaft 18, which is also referred to as the first side shaft. Furthermore, the drive axle 10 has a second shaft 20, which is also referred to as the second side shaft. The vehicle wheel 12 can be driven by or by means of the shaft 18 and can thus be driven via the shaft 18. The vehicle wheel 14 can be driven by or by means of the shaft 20 and can thus be driven via the shaft 20. The vehicle wheels 12 and 14 are driven by driving the shafts 18 and 20, whereby the motor vehicle, also referred to as a vehicle or automobile, is driven as a whole. The drive axle 10 has a first electric motor 22, which is also referred to as EM1. The first electric motor 22 has a first stator 24 and a first rotor 26, which can be driven by means of the stator 24 and can thus be rotated about a first motor axis of rotation relative to the stator 24 and also relative to a housing 28 of the drive axle 10. The electric motor 22 can provide the first drive torques for driving the vehicle wheels 12 and 14 or the shafts 18 and 20 via the rotor 26. Furthermore, the drive axle 10 comprises a differential gear 30, also known simply as a differential, by which the shafts 18 and 20 can be driven by the rotor 26, i.e., by the electric motor 22 or by the respective first drive torque. This allows the vehicle wheels 12 and 14 to be driven by the rotor 26, i.e., by the electric motor 22, by means of the shafts 18 and 20.

Furthermore, the drive axle 10 has a second electric motor 32, which is provided in addition to the first electric motor 22 and which has a second stator 34 and a second rotor 36. The electric motor 22 can be designed as an axial flow machine or, as shown in FIG. 1, as a radial flow machine. The electric motor 32 can be designed as a radial flow machine or, as shown in FIG. 1, as an axial flow machine. In the exemplary embodiment shown in FIG. 1, the electric motor 32 has two rotor parts 38 and 40, in particular in the form of discs, i.e., rotor discs, which are spaced apart from one another in the axial direction of the electric motor 32. The stator 34 is arranged at least partially between the rotor parts 38 and 40 in the axial direction of the electric motor 32. The rotor 36 and thus the rotor parts 38 and 40 can be driven by means of the stator 34 and can thus be rotated about a second motor axis of rotation relative to the stator 34 and relative to the housing 28. In the exemplary embodiment shown in FIG. 1, the electric motors 22 and 32 are arranged coaxially to one another so that the axes of rotation of the motors coincide. In particular, in motor mode of the electric motor 32, the electric motor 32 can provide second drive torques via its second rotor 36. Furthermore, it is conceivable that the electric motor 32 can be operated in a generator mode, whereby the electric motor 32 can absorb respective torques via the rotor 36, in particular as negative torques, as will be explained in more detail below.

In order to be able to achieve a particularly efficient drive of the motor vehicle, only one of the shafts 18 and 20 is assigned a clutch 42, also referred to as K1, by means of which one of the shafts 18, 20 can be connected to the second rotor 36 in a torque-transmitting manner, in this case for conjoint rotation, bypassing the other shaft 20, 18 and bypassing the differential gear 30. In the exemplary embodiment shown in FIG. 1, only the second shaft 20 is assigned a clutch, specifically the clutch 42, by means of which the shaft 20 can be connected to the second rotor 36 for conjoint rotation, bypassing the shaft 18 and bypassing the differential gear 30. This means that, in relation to the shafts 18 and 20, the respective second drive torque, which is provided or can be provided by the rotor 36, can only be transmitted to the shaft 20 in such a way that the respective second drive torque bypasses both the shaft 18 and the differential gear 30 on its path from the second rotor 36 to or onto the shaft 20. A transmission of the respective second drive torque from the second rotor 36 to the shaft 18 in such a way that the respective second drive torque bypasses both the shaft 20 and the differential gear 30 on its, in particular virtual or hypothetical, path from the rotor 36 to or onto the shaft 18 is not possible with the drive axle 10. In other words, in relation to the shafts 18 and 20, the second electric motor 32 can thus only act on the shaft 20 in such a way that the respective second drive torque bypasses the other shaft 18 and the differential gear 30 on its path from the rotor 36 to the shaft 20. Furthermore, in relation to the shafts 18 and 20 of the drive axle 10, a respective torque, which is also referred to as shaft torque, can only be transmitted from the shaft 20 to or onto the rotor 36 in such a way that the shaft torque bypasses both the differential gear 30 and the respective other shaft 18. This is not possible with regard to the shaft 18 in the exemplary embodiment shown in FIG. 1. The respective second drive torque and the respective shaft torque can be transmitted via the clutch 42 in the manner described above. By transmitting the respective second drive torque from the rotor 36 via the clutch 42 to the shaft 20 and by transmitting the respective shaft torque from the shaft 20 via the clutch 42 to the rotor 36, a respective yaw moment of the motor vehicle about the vehicle's vertical direction can be effected as required, so that particularly advantageous cornering of the motor vehicle can be achieved, both when the motor vehicle is travelling in a right-hand bend and when the motor vehicle, also known as an automobile, is travelling in a left-hand bend.

It can be seen that in the exemplary embodiment shown in FIG. 1, the rotors 26 and 36 are arranged coaxially to one another. In addition, the rotors 26 and 36 are arranged coaxially to the shafts 18 and 20. Furthermore, it is provided that the clutch 42 is designed as a friction clutch, in particular as a multi-plate clutch. The drive axle 10 has exactly one friction clutch, specifically the clutch 42.

The differential gear 30 has an input element 44 which is, in particular permanently, connected to the rotor 26 for conjoint rotation and is arranged coaxially to the rotor 26. The differential gear 30 has compensating gears 46, which are arranged coaxially to one another and thus a compensating axis of rotation common to the compensating gears 46 is held rotatably on the input element 44 relative to the input element 44. The compensating gears 46 are gear wheels, in particular bevel gears. Furthermore, the differential gear 30 has driven gears 48, which are gear wheels. A first of the driven gears 48 is connected to the shaft 18, in particular permanently, in a torque-transmitting manner or for conjoint rotation, and the second driven gear 48 is connected to the shaft 20, in particular permanently, in a torque-transmitting manner or for conjoint rotation. The driven gears 48 mesh with the compensating gears 46 and are arranged coaxially with respect to each other, so that the driven gears 48 are rotatable relative to the housing 28 and in particular preferably relative to the input element 44 about a driven gear axis of rotation common to the driven gears 48. In particular, the compensating gears 46 can be co-rotated with the input element 44, which can be rotated with the rotor 26 around the respective motor axis of rotation, relative to the housing 28, around the respective motor axis of rotation, relative to the housing 28.

The respective first drive torque can be introduced into the differential gear 30 via the input element 44, whereby the differential gear 30 can be driven. The drive axle 10 has a coupling device 50 which is provided in addition to the clutch 42 (K1) and which in the exemplary embodiment shown in FIG. 1 is designed as a form-fitting coupling device, in particular as a dog clutch. It can be seen that the clutch 42 is designed as a frictional or force-locking switching element, in particular as a disc switching element. Preferably, alternatively or additionally, the coupling device 50 is designed as a form-fitting switching element and, in particular, as a claw switching element. The rotors 26 and 36 can be connected to each other for conjoint rotation by means of the coupling device 50. In this way, the rotor 36 can be connected to the input element 44 for conjoint rotation by means of the coupling device 50.

It can be seen that the coupling device 50 can be switched between a first switching state A and a second switching state B. In switching state A, the coupling device 50 is closed, and in switching state B, the coupling device 50 is open. In switching state A, which is a coupled state of the coupling device 50, the rotors 26 and 36 are connected to each other for conjoint rotation by means of the coupling device 50. In the switching state B, which is a decoupled state of the coupling device 50, the coupling device 50 releases the rotors 26 and 36 for relative rotation with respect to one another, in particular about the respective motor axis of rotation.

For example, the clutch 42 can be switched between at least one closed state and at least one open state. In the closed state of the clutch 42, the shaft 20 is connected to the rotor 36 via the clutch 42 in a torque-transmitting manner, in particular for conjoint rotation, so that the respective second drive torque, which is provided or can be provided by the rotor 36, can be transmitted from the rotor 36 via the clutch 42 to the shaft 20, bypassing both the shaft 18 and the differential gear 30. In the open state of the clutch 42, for example, no torques can be transmitted between the rotor 36 and the shaft 20, bypassing both the differential gear 30 and the other shaft 18, it being provided in particular that in the open state of the clutch 42, the clutch 42 releases the shaft 20 and the rotor 36 for relative rotation with respect to one another about the respective motor axis of rotation.

Figure 2:
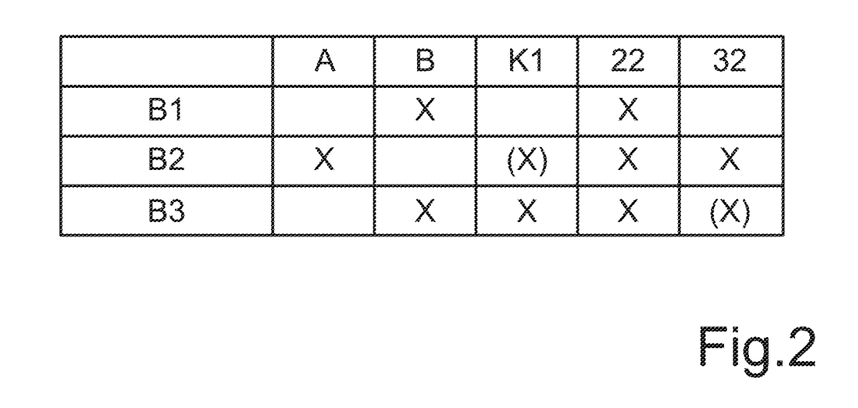
FIG. 2 a switching table to illustrate the operating modes of the drive axle.

FIG. 2 shows a switching table to further illustrate the drive axle 10. It can be seen that the switching states A and B as well as the electric motors 22 and 32, i.e., their reference signs labelled in FIG. 1, are entered in the switching table. In addition, the switching table K1 shown in FIG. 2 is entered, with K1 meaning or designating the clutch 42. Symbols are also entered in the switching table, wherein the respective symbol is an X. With regard to the switching states A and B of the coupling device 50 entered in the switching table, the respective symbol X, which may be under the respective switching state A, B, means that the coupling device 50 is in the respective switching state A, B, under which the symbol X is entered in FIG. 2. With regard to the clutch 42 (K1), the symbol X means that the clutch 42 is closed when the symbol X is shown under K1 in the switching table. If there is no symbol in the switching table under K1, the clutch 42 is open. With regard to the electric motors 22 and 32, the symbols X in FIG. 2 mean that the respective electric motor 22, 32 is operated when the symbol X is below it. FIG. 2 thus shows different operating modes of the drive axle 10.

In a first of the operating modes, labelled B1, the coupling device 50 is in its switching state B, the clutch 42 is open and, in relation to the electric motors 22 and 32, only the electric motor 22 is operated, so that, for example, the electric motor 32 is deactivated. The first operating mode B1, for example, is a comfort operating mode.

In a second of the operating modes, labelled B2, the coupling device 50 is in its switching state A, and the clutch 42 can be open or closed. In the second operating mode B2, both electric motors 22 and 32 are active, i.e. both electric motors 22 and 32 are operated, in particular in their motor mode, so that the shafts 18 and 20 and, by means of these, the vehicle wheels 12 and 14 are driven by means of both electric motors 22 and 32, in particular simultaneously. For example, the second operating mode B2 is a strong or powerful drive mode.

In a third of the operating modes, labelled B3, the coupling device 50 is in its switching state B, and the clutch 42 is closed. The electric motor 22 can be operated in the third operating mode B, so that the shafts 18 and 20 and thus the vehicle wheels 12 and 14 are driven by means of the electric motor 22. The electric motor 32 may or may not be operated in the third operating mode B3. In particular, the electric motor 32 can be operated in the third operating mode B3 in such a way that, as an electric motor, it transmits the respective second drive torque via the clutch 42 to the shaft 20, bypassing the differential gear 30 and the one shaft 18, in order to cause, for example, a respective first yaw moment around the vertical direction of the automobile. Furthermore, it is conceivable that in the third operating mode B3 the electric motor 32 is operated, in particular as a generator, in such a way that the electric motor 32 or its second rotor 36 dissipates or discharges the respective shaft torque from the shaft 20 via the clutch 42, which torque flows from the shaft 20 via the clutch 42 to the rotor 36, bypassing both the differential gear 30 and the other shaft 18. This can be used, for example, to generate a second yaw moment about the vertical direction of the motor vehicle, wherein the second yaw moment is opposite the first yaw moment. Thus, for example, the third operating mode B3 is a torque distribution function, which is also known as torque vectoring (TV). If the electric motor 32 is not operated in the third operating mode B3, the electric motor 32 does not actively cause a yaw moment around the vertical direction of the vehicle.

It can be seen from FIG. 1 that the respective vehicle wheel 12, 14 is assigned a respective planetary gearing 52, 54, also known as a planetary set or planetary gear set. The respective vehicle wheel 12, 14 can be driven by the respective associated shaft 18, 20 via the respective associated planetary gearing 52, 54. In the exemplary embodiment shown in FIG. 1, the respective planetary gearing 52, 54 has a respective sun gear 56, a respective planet carrier 58, and a respective ring gear 60. The ring gears 60 are connected, in particular permanently and for conjoint rotation, to the housing 28. Furthermore, the respective planetary gearing 52, 54 has planetary gears 62, which are mounted rotatably on the respective planetary carrier 58. The respective planetary gear 62 is engaged with the respective ring gear 60 and the respective sun gear 56. In the exemplary embodiment shown in FIG. 1, the respective sun gear 56 is connected, in particular permanently, for conjoint rotation to the respective shaft 18, 20, so that the respective sun gear 56 is a respective input of the respective planetary gearing 52, 54, via the input of which a respective torque, which can be provided or is provided by the respective shaft 18, 20 and results, for example, from the respective first drive torque, can be introduced into the respective planetary gearing 52, 54.

Furthermore, in the exemplary embodiment shown in FIG. 1, it is provided, for example, that the respective wheel 12, 14 is drivable by the respective planet carrier 58, in particular connected, very particularly permanently, for conjoint rotation to the respective planet carrier 58. Thus, the respective planet carrier 58 is a respective output of the respective planetary gearing 52, 54, via the output of which a respective output torque can be discharged from the respective planetary gearing 52, 54, wherein the respective output torque results from the respective torque which is or was introduced into the respective planetary gearing 52, 54 via the respective input. The sun gear 56 and the planet carrier 58 of the respective planetary gearing 52, 54 are thus transmission elements which are rotatable about a common planetary gear axis of rotation relative to the housing 28. In the present case, the planetary gearings 52 and 54 are arranged coaxially to each other, coaxially to the shafts 18 and 20 and coaxially to the electric motors 22 and 32.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS 10 drive axle
12 vehicle wheel
14 vehicle wheel
16 double arrow
18 first shaft
20 second shaft
22 first electric motor
24 first stator
26 first rotor
28 housing
30 differential gear
32 second electric motor
34 second stator
36 second rotor
38 rotor part
40 rotor part
42 clutch
44 input element
46 compensating gear
48 driven gear
50 coupling device
52 planetary gearing
54 planetary gearing
56 sun gear
58 planet carrier
60 ring gear
62 planet gear
A switching state
B switching state
B1 operating mode
B2 operating mode
B3 operating mode

The invention claimed is:

1. A drive axle for a motor vehicle, the drive axle comprising:
   first and second vehicle wheels;
   a first shaft configured to drive the first vehicle wheel;
   a second shaft configured to drive the second vehicle wheel;
   a first electric motor having a first stator and a first rotor;
   a differential gear configured to drive the first and second shafts, wherein, via the first and second shafts, the vehicle wheels are drivable by the first rotor of the first electric motor, wherein the differential gear has an input element permanently connected to the first rotor in a torque-transmitting manner so that drive torques provided from the first rotor are introduced into the differential gear;
   a second electric motor having a second stator and a second rotor; and
   a clutch,
   wherein only one of the first and second shafts is assigned the clutch so that the one of the first and second shafts is connectable to the second rotor to conjointly rotate in a torque-transmitting manner while bypassing another one of the first and second shafts and the differential gear.

2. The drive axle of claim 1, wherein the second rotor is arranged coaxially to the first and second shafts.

3. The drive axle of claim 1, wherein the clutch is a friction clutch.

4. The drive axle of claim 3, wherein the friction clutch is the only friction clutch of drive axle so that the one of the first and second shafts is connectable to the second rotor in a torque-transmitting manner while bypassing the another one of the first and second shafts and the differential gear.

5. The drive axle of claim 1, wherein the first rotor is arranged coaxially to the first and second shafts.

6. The drive axle of claim 1, further comprising:
   a coupling device configured to connect the second rotor to the input element and the first rotor for conjoint rotation.

7. The drive axle of claim 6, wherein the coupling device is a form-fitting coupling device.

8. The drive axle of claim 1, wherein the first wheel is assigned a first planetary gearing by which the first vehicle wheel is drivable from the first, the second wheel is assigned a second planetary gearing by which the second vehicle wheel is drivable from the second shaft, the first planetary gearing includes a sun gear permanently connected to the first shaft, and the second planetary gearing includes a sun gear permanently connected to the second shaft.

9. A motor vehicle, comprising:
   a drive axle, which comprises first and second vehicle wheels;
   a first shaft configured to drive the first vehicle wheel;
   a second shaft configured to drive the second vehicle wheel;
   a first electric motor having a first stator and a first rotor;
   a differential gear configured to drive the first and second shafts, wherein, via the first and second shafts, the vehicle wheels are drivable by the first rotor of the first electric motor, wherein the differential gear has an input element permanently connected to the first rotor in a torque-transmitting manner so that drive torques provided from the first rotor are introduced into the differential gear;
   a second electric motor having a second stator and a second rotor; and
   a clutch,
   wherein only one of the first and second shafts is assigned the clutch so that the one of the first and second shafts is connectable to the second rotor to conjointly rotate in a torque-transmitting manner while bypassing another one of the first and second shafts and the differential gear.

10. The motor vehicle of claim 9, wherein the second rotor is arranged coaxially to the first and second shafts.

11. The motor vehicle of claim 9, wherein the clutch is a friction clutch.

12. The motor vehicle of claim 11, wherein the friction clutch is the only clutch of drive axle so that the one of the first and second shafts is connectable to the second rotor in a torque-transmitting manner while bypassing the another one of the first and second shafts and the differential gear.

13. The motor vehicle of claim 9, wherein the first rotor is arranged coaxially to the first and second shafts.

14. The motor vehicle of claim 9, further comprising:
   a coupling device configured to connect the second rotor to the input element and the first rotor for conjoint rotation.

15. The motor vehicle of claim 14, wherein the coupling device is a form-fitting coupling device.

16. The motor vehicle of claim 9, wherein the first wheel is assigned a first planetary gearing by which the first vehicle wheel is drivable from the first, the second wheel is assigned a second planetary gearing by which the second vehicle wheel is drivable from the second shaft, the first planetary gearing includes a sun gear permanently connected to the first shaft, and the second planetary gearing includes a sun gear permanently connected to the second shaft.

* * * * *